P. SOULÉ.
Sulky.
No. 160,064. Patented Feb. 23, 1875.
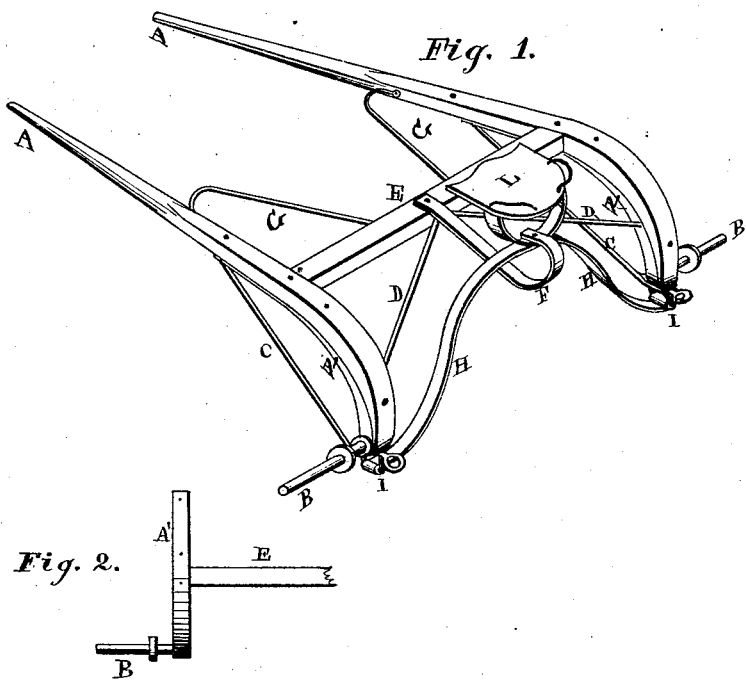
Witnesses.           Inventor,
William Stevens
Jerry Ketchum        Peter Soulé

UNITED STATES PATENT OFFICE.

PETER SOULE, OF COLESVILLE, NEW YORK.

IMPROVEMENT IN SULKIES.

Specification forming part of Letters Patent No. 160,064, dated February 23, 1875; application filed August 18, 1873.

*To all whom it may concern:*

Be it known that I, PETER SOULE, of the town of Colesville, Broome county, in the State of New York, have invented certain new and useful Improvements in Sulkies; and I hereby declare the following to be a full and exact description thereof, reference being had to the accompanying drawing forming part of this specification.

In the accompanying drawing, A A are the shafts, made in the form shown, and connected by the single-tree bar E, and braced by the braces C C, D D, and G G, which hold and support the shafts and bar E in their proper position in relation to each other. B B are the pivots for the wheels, provided with arms A' A', which arms are curved to correspond with the rear ends of the shafts A A, and firmly fastened to them. I I are links, hung under the rear ends of the shafts A to support the spring H, as shown in the drawing, which spring supports the seat L for the rider. The spring H is connected by the spring F to the bar E to steady it, and hold it in its proper position.

The single-tree may be fastened to the bar E in some convenient manner.

I claim—

The combination of the shafts A A, bar E, braces C C and D D, pivots B B, spring H, and seat L, substantially as and for the purpose set forth.

PETER SOULE.

Witnesses:
 JACOB TELLER,
 H. E. SPENCER.